Patented Sept. 15, 1931

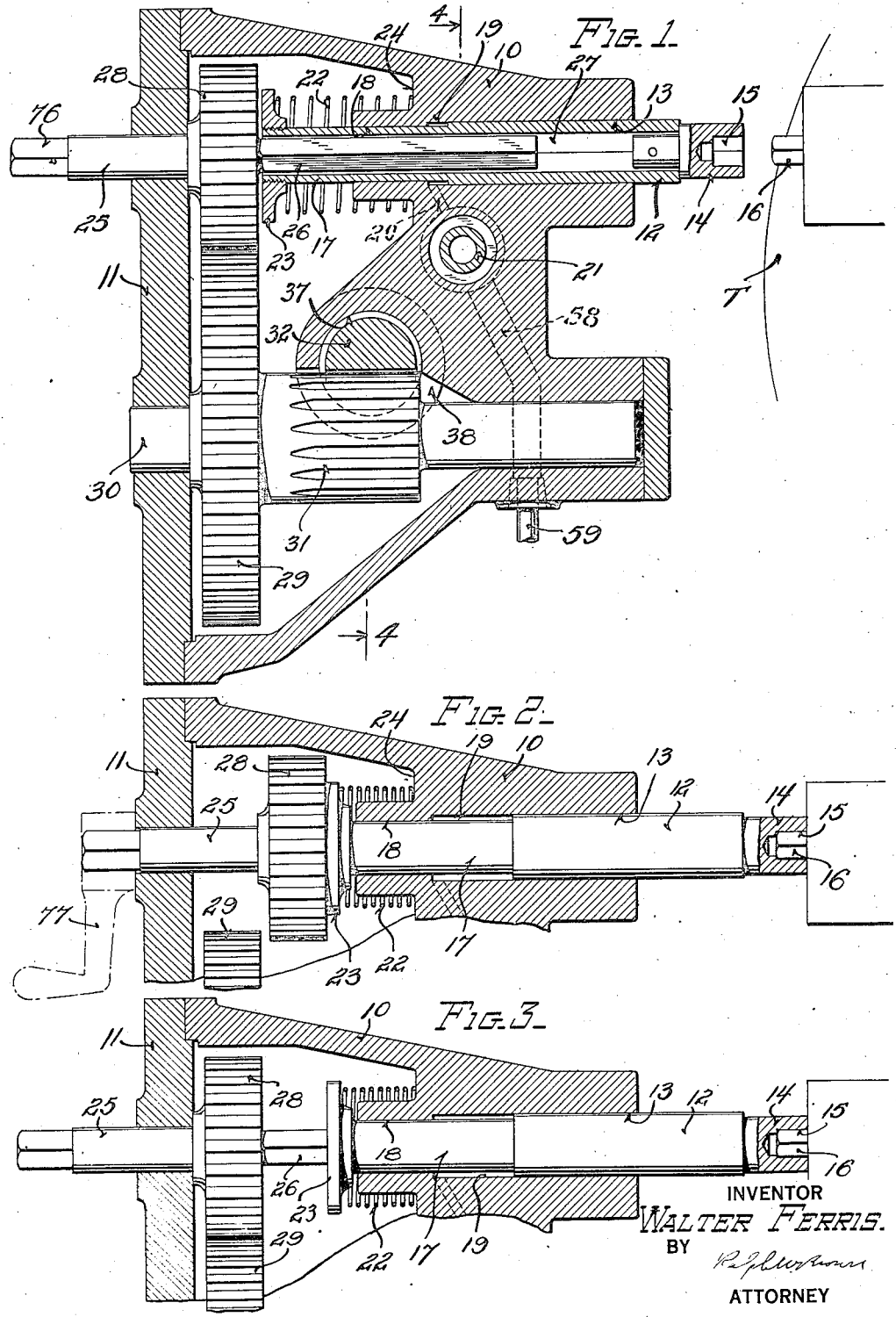

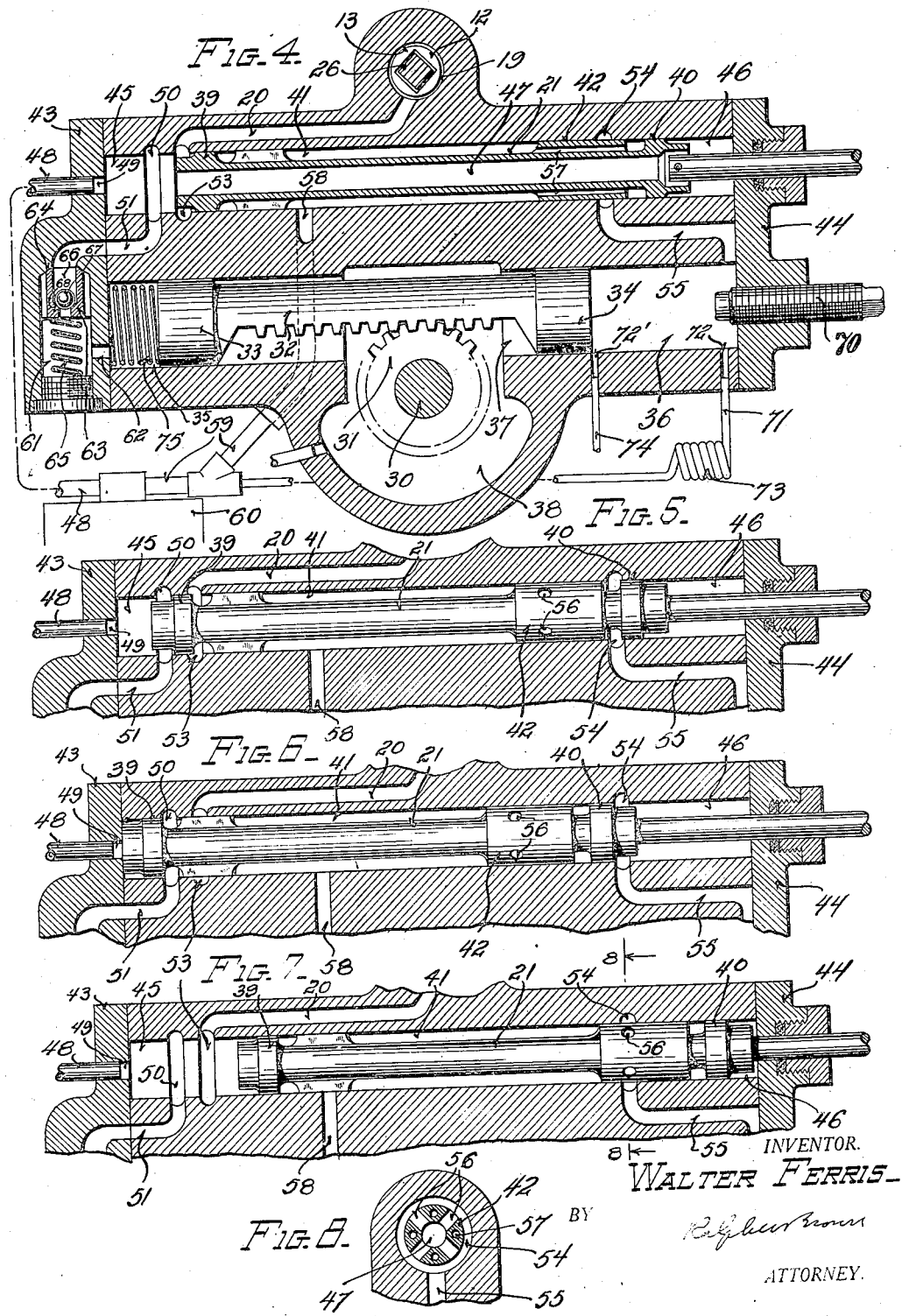

1,823,426

UNITED STATES PATENT OFFICE

WALTER FERRIS, OF MILWAUKEE, WISCONSIN, ASSIGNOR TO THE OILGEAR COMPANY, OF MILWAUKEE, WISCONSIN, A CORPORATION OF WISCONSIN

MACHINE WRENCH

Application filed June 20, 1927. Serial No. 199,935.

This invention relates to machine wrenches.

For purposes of illustration and explanation the invention will be described as embodied in a hydraulically operated wrench designed for use primarily with a multiple spindle chucking machine of a well known type although the novel features thereof may be advantageously applied to various other uses.

A multiple spindle chucking machine ordinarily involves a circular series of tool spindles and a cooperating turret for carrying a plurality of work pieces, each of the several pieces being advanced into alignment with the successive spindles by a step by step rotation of the turret. Each piece is removably clamped in one of a series of independent chucks carried by the turret and ordinarily controlled by individual screws, so that after each piece has passed through a predetermined cycle, it may be released from its individual chuck and a fresh piece inserted. This reloading of each chuck is ordinarily performed while the several work pieces in the other chucks are being operated upon. Each reloading operation requires opening the individual chuck by rotating its control screw in one direction, to release the finished work piece, and thereafter rotating the control screw in the other direction to thereby close the chuck upon the fresh piece of work inserted therein. These chuck opening and closing operations, heretofore performed by hand, are exceedingly laborious and in some cases materially impair the production capacity of the machine.

One object of the present invention is the provision of a machine wrench capable of opening and closing each of the several chucks successively, during its period of rest at the reloading station. To accomplish this purpose it is necessary to advance the driving head of the wrench into engagement with the chuck operating screw; to rotate the same in one direction, to thereby release the finished piece; to rotate the same in the other direction, until the fresh piece of work is firmly gripped by the chuck; and, thereafter, to withdraw the driving head from the screw in order to permit indexing of the turret into the next position.

Another object is the provision of a hydraulically operated wrench capable of carrying out the functions above described.

Another object is the provision in a machine wrench of means for predetermining the extent of each unscrewing operation.

Another object is the provision in a wrench of means for insuring a return of the head rotating means to a definite position after each complete operating cycle.

Another object is the provision in a machine wrench of means for insuring the advance of the driving head into operative relation with the part to be rotated prior to energizing the head rotating means.

Another object is the provision in a machine wrench of unitary means for controlling the advance as well as the rotation of the driving head.

Other objects and advantages will appear from the following description of an illustrative embodiment of the present invention.

In the drawings:

Figure 1 is a vertical sectional view of a hydraulic wrench constructed in accordance with the present invention.

Fig. 2 is a similar view of a portion of the mechanism shown in Figure 1, illustrating the position of the driving head and associated parts during manual operation.

Fig. 3 is a view similar to Figure 2, illustrating the position of the driving head and associated parts when power driven.

Fig. 4 is a sectional view taken substantially along the line 4—4 of Figure 1.

Figs. 5, 6 and 7 are similar fragmentary views illustrating several characteristic positions of the control valve shown in Figure 4.

Fig. 8 is a transverse sectional view taken substantially along the line 8—8 of Figure 7.

The wrench selected for illustration includes a hollow casting 10 cooperating with an end plate 11 to provide an appropriate housing for the operating parts. A hollow spindle 12 is closely fitted for rotation and lengthwise reciprocation within a bore 13 formed in the casting 10. The spindle projects forwardly from the casting 10 and carries an appropriate driving head 14 having a socket 15 therein shaped to receive the head 16 of a chuck operating screw. The inner end 17 of the spindle is somewhat reduced to fit a similarly reduced portion 18 of the bore 13 and to thereby provide an annular chamber 19 surrounding the spindle. Fluid pressure is transmitted to the chamber 19 through a passage 20 under the control of an appropriate valve 21, preferably such as will be hereinafter described. The spindle 12 is yieldably retained in the retracted position shown in Figure 1 by any appropriate means such as a compression spring 22, interposed between a collar 23 on the spindle and the inner wall 24 of the casting 10.

The spindle 12 is rotated by a shaft 25 journaled in the end plate 11 and having a squared portion 26 in driving engagement with and within the similarly formed interior 27 of the spindle. The arrangement is such that spindle 12 may be shifted lengthwise with respect to the squared portion 26 of the shaft; also the shaft may be adjusted lengthwise in the plate 11 for purposes which will hereinafter appear. A pinion 28 fixed to the shaft 25 meshes with a gear 29 fixed to a shaft 30 journaled at opposite ends in the plate 11 and casting 10, respectively. A broad faced pinion 31, formed as an integral part of the gear 29, meshes with rack bar 32. The rack bar 32 forms a rigid connection between two pistons 33 and 34 closely fitted for reciprocation within the opposite ends 35 and 36 of a bore 37 extending transversely through the casting 10. The bore 37 is open intermediate its ends, as at 38, to accommodate the pinion 31. The pistons 33 and 34 are hydraulically actuated by liquid supplied to one end or the other of the bore, preferably under the control of the valve 21 hereinabove mentioned.

The valve shown comprises a plunger 21 having two piston heads 39 and 40, at the opposite ends thereof, closely fitted for reciprocation within a bore 41 extending transversely through the casting 10 above the bore 37. The plunger 21 also has an intermediate elongated head 42 adjacent the piston head 40. Both bores 41 and 37 are closed by end heads 43 and 44 fixed to the sides of the casting 10. The opposite ends 45 and 46 of the bore 41 are always in open communication through a longitudinal passage 47 in the valve plunger 21 and are open to a discharge pipe 48 through a port 49 in the end head 43. An annular groove 50, surrounding the bore 41 and controlled by the piston head 39, communicates with a passage 51, which in turn communicates with the end 35 of bore 37; a similar groove 53 also controlled by piston head 39, communicates with the passage 20, hereinabove mentioned, leading to the chamber 19; and a similar groove 54, controlled by heads 40 and 42, communicates with a passage 55 leading to the end 36 of the bore 37. The elongated head 42 contains a series of radial passages 56 open to the longitudinal passage 47 and adapted for cooperation with the groove 54. Head 42 also contains several longitudinal ducts 57 disposed intermediate the radial passages 56. A passage 58 in the casting 10 communicates with the valve bore 41, intermediate the ends thereof, and with a hydraulic pressure supply pipe 59, so that the entire annular space surrounding the plunger 21, between the piston heads 39 and 40, is flooded with liquid under pressure. The pipe 59 may be supplied with liquid under pressure from any appropriate source but preferably from a variable displacement pump 60 of the type fully described in my prior Patent No. 1,578,233.

For a purpose which will hereinafter appear provision is made for yieldably resisting the flow of liquid from passage 51 into the end 35 of bore 37 but permitting a substantially free flow in a reverse direction. To this end a valve chamber 61 is provided within the end head 43, this chamber being open to the end 35 of the bore through a port 62. A hollow valve element 63 yieldably held to its cooperating seat 64, under the pressure of a spring 65, resists the entry of liquid from passage 51 to chamber 61, the passage 66 through this element being closed against flow in that direction by a check valve 67, cooperating with its seat 68. This check valve lifts freely however during reverse flow so as to permit an easy escape of liquid from the end 35 of the bore to the passage 51.

In applying the wrench to a chucking machine, such as that hereinabove mentioned, the casting 10 is fixed to the frame of the machine adjacent the rotary turret T thereof, with the spindle 12 properly aligned (as indicated in Figure 1) with the screw head 16 of one of the several work holding chucks carried by the turret. The screw head shown controls a chuck which has just been advanced into the reloading station and is ready to be opened to release the finished work piece and to receive a fresh piece after which the chuck is to be closed to grip the fresh piece prior to advancing the same into working relation with the first spindle of the machine. Since the machine itself is no part of the present invention further description thereof is deemed unnecessary.

Prior to the chuck opening operation the several operating parts of the wrench assume the positions indicated in Figures 1 and 4, namely:—the spindle 12 is retracted, the pistons 33 and 34, and connecting rack bar 32, are retracted toward the left (Fig.

4), and the valve plunger 21 is in an intermediate position. In this position of the valve, groove 54 is closed by head 42 so that passage 55 is blocked, groove 50 is open to the exhaust port 49 so that there is no pressure in the end 35 of bore 37, and groove 53 is also open to the exhaust port 49 so that no pressure exists in passage 20 or chamber 19. When the valve plunger 21 is shifted into the position shown in Figure 6, the piston head 39 blocks communication between exhaust port 49 and grooves 50 and 53 and communication is established between these grooves and the liquid supply passage 58, so that liquid is immediately transmitted through the passage 20 to the chamber 19 to advance the spindle 12 and driving head 14 against the screw head 16. The spring loaded valve 63 prevents the flow of liquid from passage 51 to port 62 until the pressure thereof has been increased by the stalling of the spindle 12 and head 14 against the screw head 16. The pressure, thus increased, forces the valve 63 into open position against the pressure of spring 65 and the liquid then flows through port 62 and end chamber 35 against the piston 33, thereby forcing the rack bar 32 toward the right. (Fig. 4.) During this advance of the rack bar 32 and pistons 33 and 34 toward the right liquid is free to escape from the end chamber 36 through the passage 55, groove 54, end chamber 46, longitudinal passage 47 in the valve plunger 21, end chamber 45, and port 49 to the exhaust pipe 48. This advance of the bar 32 is transmitted to the shaft 25, through the pinion 31, gear 29 and pinion 28, to rotate the shaft, and consequently the spindle 12 and head 14 in such direction as to release the chuck controlled by the screw head 16.

It will be noted that the interposition of the spring loaded valve 63 between the passage 51 and end chamber 35, insures the advance of the head 14 into engagement with the screw head 16 before the spindle 12 and head 14 are rotated. Should the head 14 be out of rotative alignment with the screw head 16, so as to prevent the reception of the screw head within the socket 15 upon the initial advance of the spindle, the pressure maintained in the passage 20 and chamber 19 will force the head 14 over and into driving engagement with the screw head upon the initial rotation of the spindle under the action of the gears. The unscrewing operation continues throughout the advance of the rack bar 32 toward the right. The extent of this operation may be controlled by any appropriate means such as a stop screw 70, threaded through the end head 44 into the end chamber 36, and serving as an adjustable limit for the advance of the piston 34 and rack bar 32. The stalling of the piston 34 against the end of the screw 70 marks the end of the chuck opening operation and the several parts of the wrench then remain at rest until the finished work piece has been removed from that particular chuck and a fresh piece inserted.

To close the chuck the valve plunger 21 is shifted into the position shown in Figure 5, in which position passage 20 remains exposed to the pressure in passage 58, passage 51 is opened to the exhaust pipe 48 through the end chamber 45, and passage 55 is exposed to the pressure in passage 58 through the passages 57 in the head 42. The rack bar 32 is thus forced toward the left by the pressure applied to piston 34 through the passage 55, the liquid from the end chamber 35 escaping through the port 62, passage 66 in the valve 63, passage 51, end chamber 45, and port 49 to the exhaust valve 48. This retraction of the rack bar 32 imparts rotation to the spindle 12, head 14 and screw head 16 in such direction as to close the chuck upon the fresh piece of work. This closing operation continues until the fresh piece of work is firmly gripped and the movement of the rack bar 32 is arrested by the reaction of the gripping pressure of the chuck jaws upon the work.

The valve plunger 21 is then shifted into the position shown in Figure 7 in which position passage 51 remains open to the exhaust port 49, passage 55 is opened to the exhaust port through the passages 56 and passage 47 in the valve plunger, and passage 20 is opened to the exhaust port through the end chamber 45. With the pressure thus released in the end chamber 36, the working tension in the gearing and spindle 12 is released with a consequent release of pressure between the screw head 16 and walls of the socket 15, and the spindle 12 is free to retract under the action of the spring 22. After retraction of the spindle to the position in Figure 1, the valve plunger 21 is returned to the position shown in Figure 4 and the wrench is ready for the next chuck reloading operation.

The amount of rotation of the screw 16 required to insure firm gripping of the chuck upon each fresh piece of work ordinarily varies somewhat with the work, and unless some provision were made to compensate for this variation, the pistons 33 and 34 and connecting rack bar 32 would ultimately assume such a position within the bore 37 as to render the wrench inoperative for the purposes intended. In order to insure against such a contingency provision is made in the wrench shown for insuring that the pistons 33 and 34 and connecting rack bar 32 assume a certain definite position within the bore 37 after the completion of each cycle. In this instance the end chamber 36 is permanently connected to the discharge side of the pump 60 through a pipe 71, connected with pipe 59, and leading to a port 72 through the wall of the end chamber 36. An appropriate choke in the form of a coil 73 of small tubing is inserted within the pipe line 71, so that liquid enters the chamber 36 at a very slow rate. A narrow bleed duct 72′, formed in the wall of the bore and controlled by the piston 34, communicates with a drain pipe 74. A spring 75 within the chamber 35 urges the pistons and rack bar 32 toward the right. It will be noted that with the parts in the position of Figure 4, passage 55 is closed so that liquid supplied through pipe 71 tends to force the piston 34 toward the left to thereby open the bleed duct 72′. The spring 75 however tends to force the piston toward the right to close the duct 72′. The piston thus assumes a position of balance at a point at which the rate of liquid supplied through pipe 71 is equal to that discharged through the bleed duct. If during the last stage of the operating cycle above described (the chuck closing stage) the piston 34 fails to move to the left far enough to uncover the duct 72′, the liquid supplied through the pipe 71 will force the piston toward the left until the balanced condition, just mentioned is reached. If, on the other hand, the piston 34 moves beyond the duct 72′, before completing the chuck closing operation, the spring 75 returns it toward the duct 72′ until this balanced condition is attained. The duct 72′ is so narrow as to have no appreciable effect upon the pressure in the chamber 36 when the chamber is open to the pressure of the main pump through passage 55, as when performing the chuck closing operation. It will thus be noted that the pistons 33 and 34 are always returned to a definite position at the completion of each cycle irrespective of the extent of movement thereof that may be required to complete the chuck closing operation.

Provision is also made for operating the wrench by hand. This is found expedient when initially loading or unloading the chucking machine. As hereinabove pointed out the shaft 25 is mounted for lengthwise adjustment within the plate 10. The exposed end 76 of this shaft is squared or otherwise fashioned to receive an appropriate handle or crank 77. To effect manual operation of the wrench the crank 77 is applied to the end 76 of the shaft 25 and the shaft is forced inwardly so as to advance the spindle 12, against the pressure of the spring 22, until the head 14 is engaged with the screw head 16. (See Fig. 2.) When thus advanced the pinion 28 is disengaged from the gear 29 and the spindle 12 is free to be turned under the action of the crank to thereby operate the screw head 16 in either direction. Upon completion of the hand operation the crank is ordinarily removed and the shaft 25 returned into the position of Figure 1 under the action of the spring 22.

Various changes may be made in the embodiments of the invention hereinabove specifically described without departing from or sacrificing any of the advantages of the invention as defined in the appended claims.

I claim:—

1. In a machine wrench the combination of a driving head, hydraulically actuated head advancing means, an independent hydraulically actuated head rotating means, a fluid pressure source, and control means including means for insuring the advance of said head prior to rotation thereof.

2. In a machine wrench the combination of a driving head, hydraulically actuated head advancing means, hydraulically actuated means for rotating said head, a hydraulic pressure source, and means controlled by the pressure in said advancing means for controlling communication between said hydraulic pressure source and said head rotating means.

3. In a machine wrench the combination of a driving head, fluid actuated head advancing means, fluid actuated means for rotating said head in either direction, and control means for rendering said advancing means active and adjustable to effect rotation of said head in one direction or the other without retracting said advancing means.

4. In a machine wrench the combination of a driving head, means for advancing and retracting said head, means for rotating said head in either direction, and unitary control means cooperating with said first named means to effect an advance and retraction of said head and with said last named means, to effect rotation of said head first in one direction and then the other, while said head is advanced.

5. In a machine wrench the combination of a driving spindle, a head carried thereby, fluid actuated means for moving said spindle lengthwise, gearing for rotating said spindle, a second fluid actuated means for driving said gearing independently of said first named means, a fluid pressure source, and means including a valve for controlling communication between said source and both of said fluid actuated means to control the operation of said spindle.

6. In a machine wrench the combination of a spindle, fluid actuated means for moving said spindle lengthwise, a rack, a second fluid actuated means for operating said rack independently of said first named means, a gear set forming a driving connection between said rack and spindle to rotate said spindle, a fluid pressure source, and means controlling communication between said fluid pressure source and said first named fluid actuated means and between said source and said second fluid actuated means to thereby control the operation of said spindle.

7. In a machine wrench the combination of a body portion, a spindle mounted for rotation and for lengthwise movement therein, fluid actuated means for advancing said spindle lengthwise, a second fluid actuated means for rotating said spindle independently of said first named means, and manually operated means for advancing said spindle lengthwise and for rotating the same, said second fluid actuated means including driving connections rendered inoperative by the manual advance of said spindle.

8. In a machine wrench the combination of a body portion, a spindle mounted for rotation and for lengthwise movement therein, power actuated means for advancing said spindle lengthwise, a separate power actuated means for rotating said spindle, and manually operated means for advancing and rotating said spindle, said power actuated rotating means including driving connections rendered inoperative by the manual advance of said spindle.

9. In a machine wrench the combination of a body portion, a spindle mounted for rotation and for lengthwise movement therein, fluid actuated means for moving said spindle lengthwise, means including a piston and cylinder for rotating said spindle, adjustable means for predetermining the limit of piston stroke in one direction to thereby limit the rotation of said spindle in one direction, and a second means operable independently of said first named means for moving said spindle lengthwise.

10. In a machine wrench the combination of a body portion, a spindle mounted for rotation and for lengthwise movement therein, power actuated means for rotating said spindle, adjustable means to limit the operation of said power actuated means in one direction to thereby predetermine the extent of rotation of said spindle, and a second means operable independently of said first named means for moving said spindle lengthwise.

11. In a machine wrench the combination of a spindle, means including a piston and cylinder for rotating said spindle, adjustable means for limiting the relative movement between said piston and cylinder in one direction, means automatically operable to return said piston to a predetermined point in said cylinder after each reciprocation thereof, and means operable independently of said first named means for advancing and retracting said spindle.

12. In a machine wrench the combination of a spindle, means including a piston and cylinder for rotating said spindle, a fluid pressure source, fluid connections including a valve between said source and cylinder for controlling the rotation of said spindle, a restricted fluid connection between said source and one end of said cylinder through which said piston is urged in one direction, and a fluid outlet controlled by said piston and cooperating with said restricted connection to automatically position said piston within said cylinder when said first named connection is inactive.

13. The combination of a piston and cylinder, a fluid pressure source, fluid connections including a valve between said cylinder and source for effecting relative movement between said piston and cylinder in either direction, means operable when said connections are inactive to urge said piston in one direction, and means controlled by said piston and cooperating with said means to automatically position said piston at a predetermined point in said cylinder.

In witness whereof, I hereunto subscribe my name this 10th day of June, 1927.

WALTER FERRIS.